(12) United States Patent
Numata

(10) Patent No.: US 11,448,915 B2
(45) Date of Patent: Sep. 20, 2022

(54) DISPLAY DEVICE

(71) Applicant: Japan Display Inc., Tokyo (JP)

(72) Inventor: Yudai Numata, Tokyo (JP)

(73) Assignee: Japan Display Inc., Tokyo (JP)

( * ) Notice: Subject to any disclaimer, the term of this patent is extended or adjusted under 35 U.S.C. 154(b) by 18 days.

(21) Appl. No.: 17/147,566

(22) Filed: Jan. 13, 2021

(65) Prior Publication Data

US 2021/0132433 A1    May 6, 2021

Related U.S. Application Data

(63) Continuation of application No. PCT/JP2019/027822, filed on Jul. 12, 2019.

(30) Foreign Application Priority Data

Jul. 23, 2018    (JP) ............... JP2018-137541

(51) Int. Cl.
| | | |
|---|---|---|
| *G02F 1/1333* | (2006.01) | |
| *G02F 1/1335* | (2006.01) | |
| *G02F 1/1343* | (2006.01) | |
| G02F 1/1337 | (2006.01) | |
| G02F 1/1334 | (2006.01) | |

(52) U.S. Cl.
CPC .. *G02F 1/133345* (2013.01); *G02F 1/133524* (2013.01); *G02F 1/134336* (2013.01); *G02F 1/13347* (2021.01); *G02F 1/133512* (2013.01); *G02F 1/133738* (2021.01)

(58) Field of Classification Search
None
See application file for complete search history.

(56) References Cited

U.S. PATENT DOCUMENTS

| | | |
|---|---|---|
| 5,581,380 A | 12/1996 | Bergman |
| 2010/0085510 A1 | 4/2010 | Okuyama et al. |
| 2015/0293402 A1 | 10/2015 | Shinkai et al. |
| 2016/0070047 A1 | 3/2016 | Okuyama et al. |
| 2018/0081248 A1 | 3/2018 | Kitamura |

FOREIGN PATENT DOCUMENTS

| | | |
|---|---|---|
| JP | 5-88174 A | 4/1993 |
| JP | 2010-92682 A | 4/2010 |
| JP | 2014-35448 A | 2/2014 |
| JP | 2016-57338 A | 4/2016 |
| JP | 2018-49089 A | 3/2018 |
| WO | WO 2012/020669 A1 | 2/2012 |

OTHER PUBLICATIONS

International Search Report dated Aug. 20, 2019 in PCT/JP2019/027622 filed Jul. 12, 2019, citing documents AC-AD and AO-AQ therein, 2 pages.

Office Action dated May 10, 2022, in corresponding Japanese Patent Application No. 2018-137541 (English Translation only), citing documents AA and AO therein, 4 pages.

*Primary Examiner* — Thanh Nhan P Nguyen
(74) *Attorney, Agent, or Firm* — Maier & Maier, PLLC

(57) ABSTRACT

According to one embodiment, a display device includes, a first transparent substrate having a side surface and a main surface, a first alignment film disposed along the main surface, a first transparent layer located between the first transparent substrate and the first alignment film, a second transparent substrate, a pixel electrode electrically connected to a switching element, a liquid crystal layer, and a light-emitting element opposed to the side surface. The first transparent layer overlaps a part of the pixel electrode and has a lower refractive index than the first transparent substrate.

12 Claims, 10 Drawing Sheets

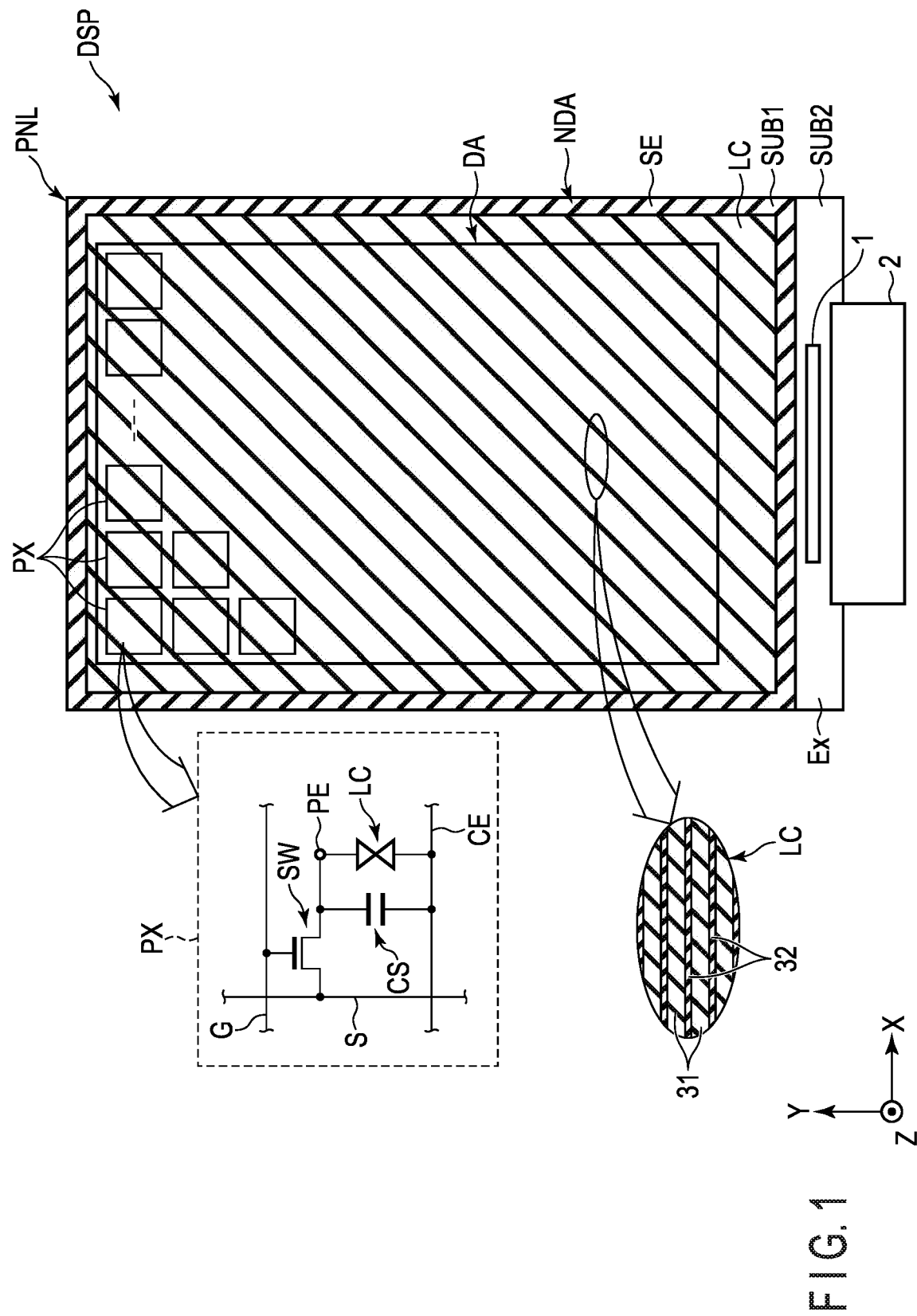
F I G. 1

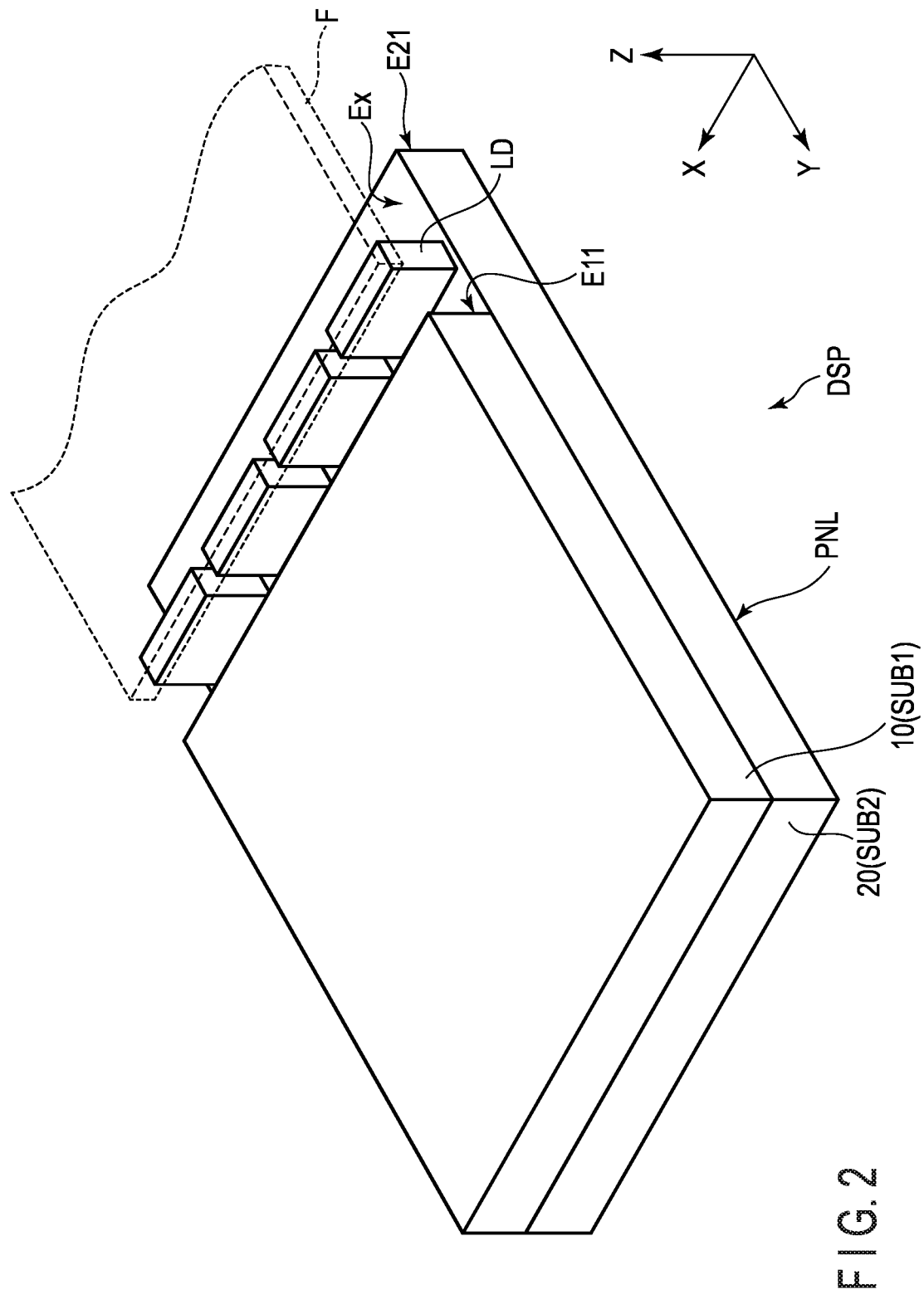
F I G. 2

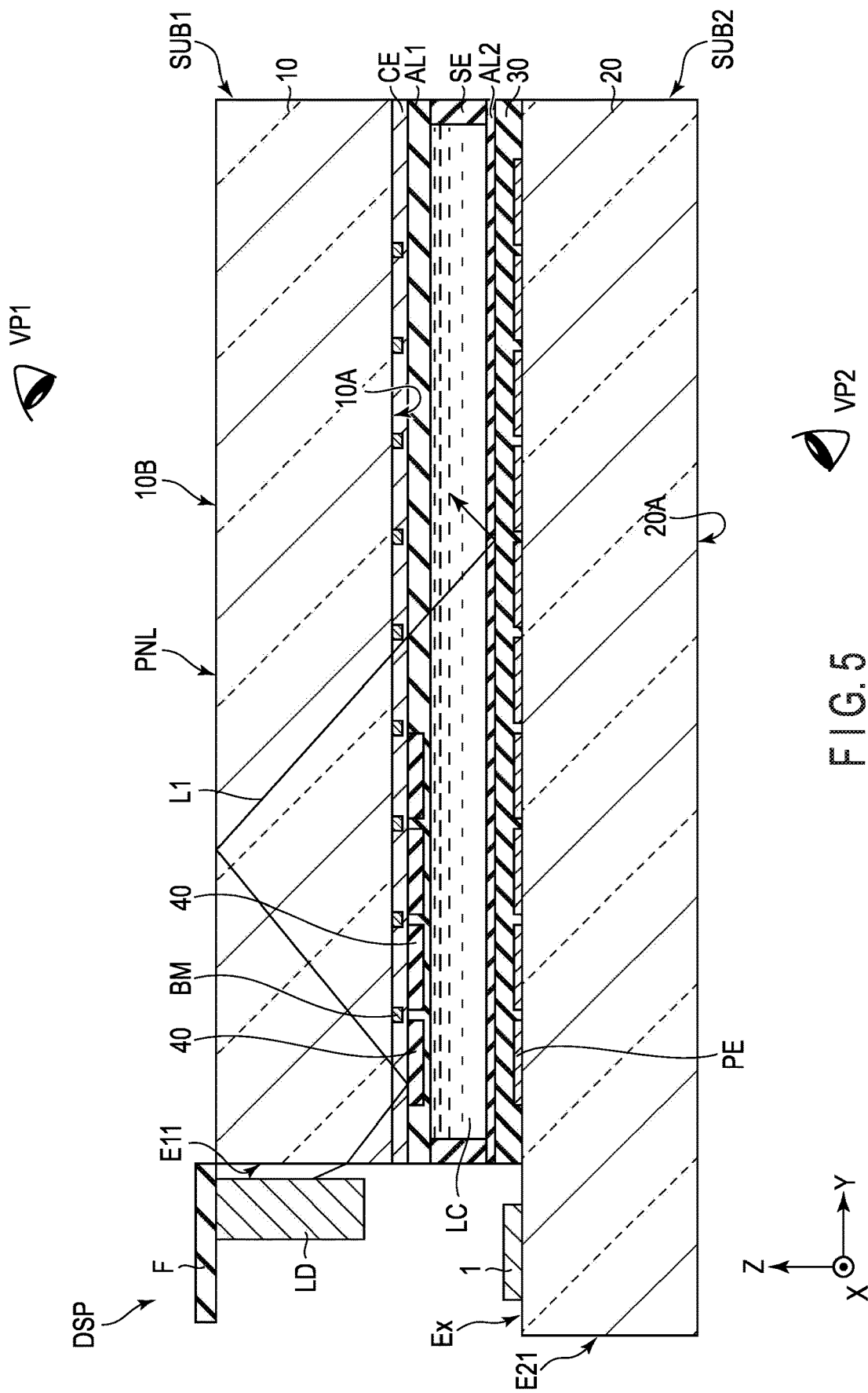
F I G. 5

DISPLAY DEVICE

CROSS-REFERENCE TO RELATED APPLICATIONS

This application is a Continuation Application of PCT Application No. PCT/JP2019/027822, filed Jul. 12, 2019 and based upon and claiming the benefit of priority from Japanese Patent Application No. 2018-137541, filed Jul. 23, 2018, the entire contents of all of which are incorporated herein by reference.

FIELD

Embodiments described herein relate generally to a display device.

BACKGROUND

Recently, various forms of display device have been proposed. An illumination device including a light modulation layer containing a bulk and fine particles having optical anisotropy in a light modulation element bonded to a light guide panel is disclosed. In another example, a light source device including a light conversion portion containing a polymer dispersed liquid crystal and converting an incident light intensity is disclosed.

BRIEF DESCRIPTION OF THE DRAWINGS

FIG. 1 is a plan view showing one configuration example of a display device DSP of the present embodiment.

FIG. 2 is a perspective view showing main parts of the display device DSP shown in FIG. 1.

FIG. 5 is a cross-sectional view showing one configuration example of the display device DSP of the present embodiment.

DETAILED DESCRIPTION

Figure 3:
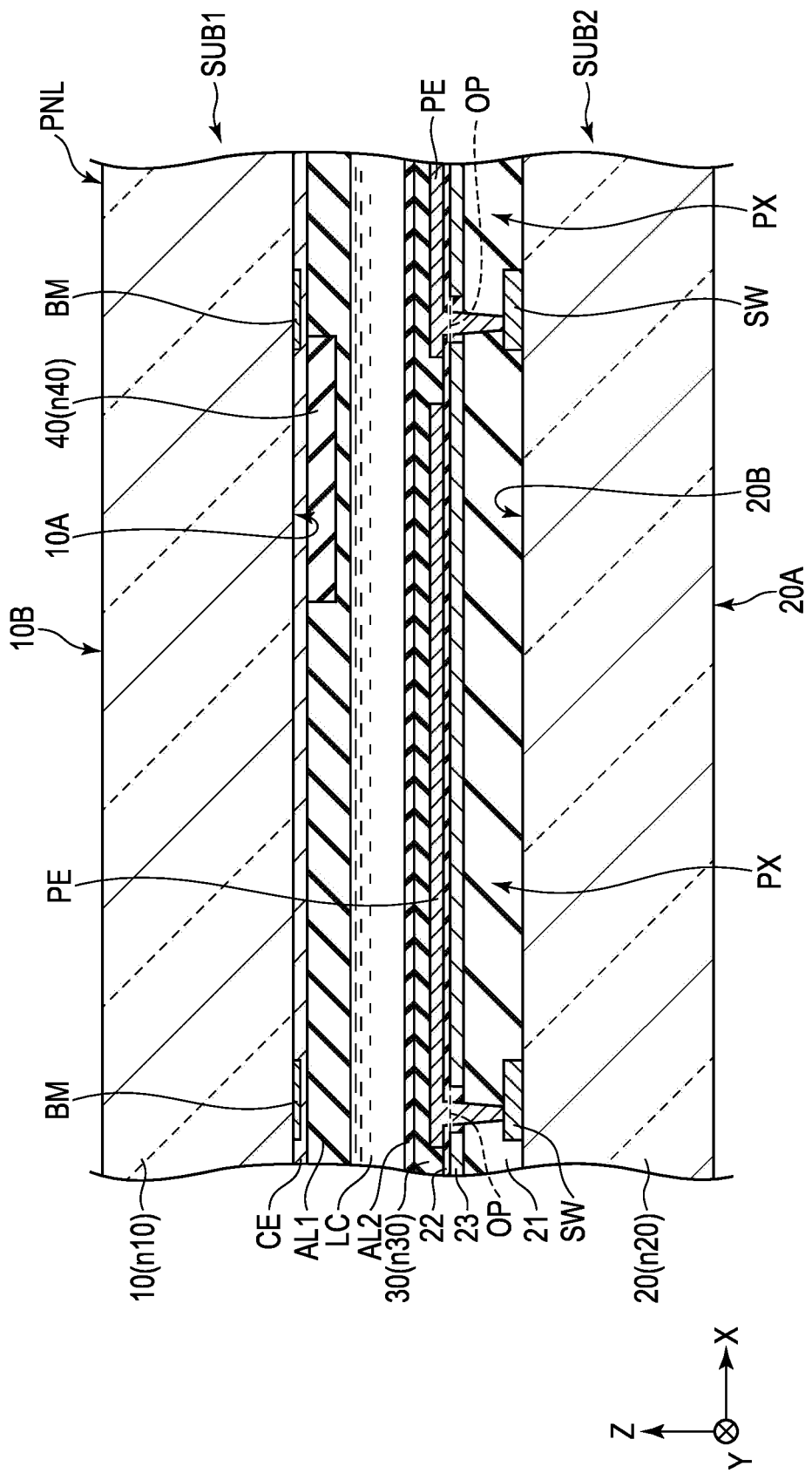
FIG. 3 is a cross-sectional view showing one configuration example of a display panel PNL shown in FIG. 1.

According to the present embodiment, there is provided a display device including: a first substrate including a first transparent substrate having a side surface and a main surface, a first alignment film disposed along the main surface, and a first transparent layer located between the first transparent substrate and the first alignment film; a second substrate including a second transparent substrate, a scanning line, a signal line crossing the scanning line, a switching element electrically connected to the scanning line and the signal line, and a pixel electrode electrically connected to the switching element; a liquid crystal layer held between the first substrate and the second substrate and containing a stripe-shaped polymer and liquid crystal molecules; and a light-emitting element opposed to the side surface. The first transparent layer overlaps a part of the pixel electrode and has a lower refractive index than the first transparent substrate.

According to the present embodiment, there is provided a display device including: a first substrate including a first transparent substrate having a side surface and a main surface, and a first alignment film disposed along the main surface; a second substrate including a second transparent substrate, a scanning line, a signal line crossing the scanning line, a switching element electrically connected to the scanning line and the signal line, a pixel electrode electrically connected to the switching element, a second alignment film located on the pixel electrode, and a second transparent layer located between the switching element and the second alignment film; a liquid crystal layer held between the first substrate and the second substrate and containing a stripe-shaped polymer and liquid crystal molecules; and a light-emitting element opposed to the side surface. The second transparent layer overlaps the pixel electrode and has a lower refractive index than the first transparent substrate.

According to the present embodiment, there is provided a display device including a first substrate, a second substrate, a liquid crystal layer held between the first substrate and the second substrate and containing a stripe-shaped polymer and liquid crystal molecules, a light-emitting element, and pixels arrayed in a matrix. The first substrate includes a first transparent substrate having a side surface opposed to the light-emitting element, a first alignment film contacting the liquid crystal layer, and a first transparent layer located between the first transparent substrate and the first alignment film. The second substrate includes a second transparent substrate, a second alignment film contacting the liquid crystal layer, and a second transparent layer located between the second transparent substrate and the second alignment film. The first transparent layer and the second transparent layer are insulating layers. An installation area per pixel of the first transparent layer is less than an installation area per pixel of the second transparent layer.

Embodiments will be described hereinafter with reference to the accompanying drawings. The disclosure is merely an example, and proper changes in keeping with the spirit of the invention, which are easily conceivable by a person of ordinary skill in the art, come within the scope of the invention as a matter of course. In addition, in some cases, in order to make the explanation clearer, the widths, thicknesses, shapes and the like of the respective parts are illustrated schematically in the drawings, rather than as an accurate representation of what is implemented. However, such schematic illustration is merely exemplary, and in no way restricts the interpretation of the invention. In addition, in the specification and drawings, constituent elements which function in the same or a similar manner to those described in connection with preceding drawings are denoted by the same reference numbers, and detailed explanations of them that are considered redundant are appropriately omitted.

FIG. 1 is a plan view showing one configuration example of a display device DSP of the present embodiment. A first direction X, a second direction Y and a third direction Z are orthogonal to one another in one example but may cross one another at an angle other than 90 degrees. The first direction X and the second direction Y correspond to directions parallel to the main surface of a substrate constituting the display device DSP, and the third direction Z corresponds to the thickness direction of the display device DSP. In the specification, a direction from a second substrate SUB2 toward a first substrate SUB1 is referred to as an upper side (or simply above), and a direction from the first substrate SUB1 toward the second substrate SUB2 is referred to as a lower side (or simply below). When described as "the second member above the first member" and "the second member below the first member", the second member may be in contact with the first member or apart from the first member. Furthermore, an observation position where the display device DSP is observed is assumed to be located on a pointing end side of an arrow indicating the third direction Z, and viewing toward an X-Y plane defined by the first direction X and the second direction Y from this observation position is referred to as planar view.

In the present embodiment, a liquid crystal display device employing a polymer dispersed liquid crystal will be explained as an example of the display device DSP. The display device DSP includes a display panel PNL, an IC chip 1 and a wiring board 2.

The display panel PNL includes a first substrate SUB1, a second substrate SUB2, a liquid crystal layer LC and a sealant SE. The first substrate SUB1 and the second substrate SUB2 are formed in a flat plate shape parallel to the X-Y plane. The first substrate SUB1 and the second substrate SUB2 overlap in planar view. The first substrate SUB1 and the second substrate SUB2 are bonded together by the sealant SE. The liquid crystal layer LC is held between the first substrate SUB1 and the second substrate SUB2 and is sealed by the sealant SE. In FIG. 1, the liquid crystal layer LC and the sealant SE are indicated by different hatch lines.

As enlarged and schematically shown in FIG. 1, the liquid crystal layer LC includes a polymer dispersed liquid crystal containing a polymer 31 and liquid crystal molecules 32. In one example, the polymer 31 is a liquid crystal polymer. The polymer 31 is formed in a stripe shape extending along the first direction X. The liquid crystal molecules 32 are dispersed in gaps of the polymer 31, and are aligned such that major axes of them extend along the first direction X. The polymer 31 and the liquid crystal molecule 32 each have optical anisotropy or refractive anisotropy. The responsiveness to an electric field of the polymer 31 is less than the responsiveness to an electric field of the liquid crystal molecule 32.

In one example, the alignment direction of the polymer 31 hardly changes regardless of the presence or absence of an electric field. On the other hand, the alignment direction of the liquid crystal molecule 32 changes in accordance with an electric field in a state where a high voltage of greater than or equal to a threshold value is applied to the liquid crystal layer LC. In a state where voltage is not applied to the liquid crystal layer LC, the optical axis of the polymer 31 and the optical axis of the liquid crystal molecule 32 are parallel to each other, and light entering the liquid crystal layer LC is transmitted almost without being scattered in the liquid crystal layer LC (transparent state). In a state where voltage is applied to the liquid crystal layer LC, the optical axis of the polymer 31 and the optical axis of the liquid crystal molecule 32 cross each other, and light entering the liquid crystal layer LC is scattered in the liquid crystal layer LC (scattering state).

The display panel PNL includes a display portion DA which displays an image and a frame-shaped non-display portion NDA which surrounds the display portion DA. The sealant SE is located in the non-display portion NDA. The display portion DA includes pixels PX arrayed in a matrix in the first direction X and the second direction Y.

As shown enlarged in FIG. 1, each pixel PX includes a switching element SW, a pixel electrode PE, a common electrode CE, the liquid crystal layer LC and the like. The switching element SW is composed of, for example, a thin-film transistor (TFT) and is electrically connected to a scanning line G and a signal line S. The scanning line G is electrically connected to the switching elements SW in the respective pixels PX disposed in the first direction X. The signal line S is electrically connected to the switching elements SW in the respective pixels PX disposed in the second direction Y. The pixel electrode PE is electrically connected to the switching element SW. Each pixel electrode PE is opposed to the common electrode CE and drives the liquid crystal layer LC (in particular, the liquid crystal molecules 32) by an electric field generated between the pixel electrode PE and the common electrode CE. A capacitance CS is formed, for example, between an electrode having the same potential as the common electrode CE and an electrode having the same potential as the pixel electrode PE.

The second substrate SUB2 has an extension portion Ex. In the illustrated example, the extension portion Ex correspond to a region in which the second substrate SUB2 does not overlap the first substrate SUB1.

The IC chip 1 and the wiring board 2 are each connected to the extension portion Ex. The IC chip 1 has, for example, a built-in display driver which outputs a signal necessary for image display, and the like. The wiring board 2 is a bendable flexible printed circuit board. Note that the IC chip 1 may be connected to the wiring board 2. The IC chip 1 and the wiring board 2 read a signal from the display panel PNL in some cases but mainly function as a signal source which supplies a signal to the display panel PNL.

FIG. 2 is a perspective view showing main parts of the display device DSP shown in FIG. 1. The display device DSP includes a plurality of light-emitting elements LD in addition to the display panel PNL.

The first substrate SUB1 and the second substrate SUB2 include transparent substrates 10 and 20, respectively. The transparent substrates 10 and 20 have side surfaces E11 and E21, respectively. The side surfaces E11 and E21 extend along the first direction X and do not overlap in the third direction Z. The extension portion Ex extends along the second direction Y between the side surface E11 and the side surface E21. The light-emitting elements LD are disposed at intervals in the first direction X and are opposed to the side surface E11. In the illustrated example, the light-emitting elements LD overlap the extension portion Ex. The light-emitting elements LD are connected to a wiring board F. The light-emitting element LD is, for example, a light-emitting diode. Although not described in detail, the light-emitting element LD includes a red light-emitting portion, a green light-emitting portion and a blue light-emitting portion. Light emitted from the light-emitting element LD travels along the direction of an arrow indicating the second direction Y.

FIG. 3 is a cross-sectional view showing one configuration example of the display panel PNL shown in FIG. 1. Here, a cross section of an X-Z plane defined by the first direction X and the third direction Z will be explained.

The second substrate SUB2 includes the transparent substrate 20, insulating films 21 and 22, a capacitance electrode 23, the switching element SW, the pixel electrode PE, a transparent layer 30 and an alignment film AL2. The second substrate SUB2 further includes the scanning line G and the signal line S shown in FIG. 1. The transparent substrate 20 includes a main surface (lower surface) 20A and a main surface (upper surface) 20B on an opposite side to the main surface 20A. The main surfaces 20A and 20B are surfaces substantially parallel to the X-Y plane. The switching element SW is disposed on the main surface 20B. The insulating film 21 covers the switching element SW. The capacitance electrode 23 is located between the insulating films 21 and 22. On the insulating film 22, the pixel electrode PE is disposed for each pixel PX. The pixel electrode PE is electrically connected to the switching element SW via an opening OP of the capacitance electrode 23. The pixel electrode PE overlaps the capacitance electrode 23 across the insulating film 22 and forms the capacitance CS of the pixel PX. The transparent layer 30 is continuously disposed without interruption along the first direction X and covers the pixel electrodes PE. The alignment film AL2 covers the transparent layer 30. In the illustrated example, the transparent layer 30 is disposed over the entire region of the pixel PX, is located between the pixel electrode PE and the alignment film AL2, and is in contact with both the pixel electrode PE and the alignment film AL2. In addition, between the pixel electrodes PE which are adjacent to each other in the first direction X, the transparent layer 30 is in contact with the insulating film 22. Note that another insulating layer or another conductive layer may be disposed between the transparent layer 30 and the pixel electrode PE and between the transparent layer 30 and the alignment film AL2. In addition, the transparent layer 30 is not limited to the illustrated example but only has to be located between the transparent substrate 20 and the alignment film AL2 or between the switching element SW and the alignment film AL2.

The first substrate SUB1 includes the transparent substrate 10, a light-shielding layer BM, the common electrode CE, a transparent layer 40 and an alignment film AL1. The transparent substrate 10 comprises a main surface (lower surface) 10A and a main surface (upper surface) 10B on an opposite side to the main surface 10A. The main surfaces 10A and 10B are surfaces substantially parallel to the X-Y plane. The main surface 10A of the transparent substrate 10 faces the main surface 20B of the transparent substrate 20. The light-shielding layer BM and the common electrode CE are disposed on the main surface 10A. The light-shielding layer BM is located, for example, directly above the switching element SW and directly above the scanning line G and the signal line S which are not shown in the drawing. The common electrode CE is disposed over the pixels PX and directly covers the light-shielding layer BM. The common electrode CE is electrically connected to the capacitance electrode 23 has the same potential as the capacitance electrode 23. The transparent layer 40 is disposed in a part below the common electrode CE and overlaps a part of the pixel electrode PE. The alignment film AL1 covers the transparent layer 40 and covers the common electrode CE in a part in which the transparent layer 40 is not disposed. In the illustrated example, in a region on the right side of the pixel PX, the transparent layer 40 is located between the common electrode CE and the alignment film AL1 and is in contact with both the common electrode CE and the alignment film AL1. Note that another insulating layer or another conductive layer may be disposed between the transparent layer 40 and the common electrode CE and between the transparent layer 40 and the alignment film AL1. In addition, the transparent layer 40 is not limited to the illustrated example but only has to be located between the transparent substrate 10 and the alignment film AL1.

The liquid crystal layer LC is located between the first substrate SUB1 and the second substrate SUB2 and is in contact with the alignments films AL1 and AL2.

The transparent substrates 10 and 20 are insulating substrates such as glass substrates or plastic substrates. The insulating film 21 is formed of a transparent insulating material such as silicon oxide, silicon nitride, silicon oxynitride or acrylic resin. In one example, the insulating film 21 includes an inorganic insulating film and an organic insulating film. The insulating film 22 is an inorganic insulating film of silicon nitride or the like. The capacitance electrode 23, the pixel electrode PE and the common electrode CE are transparent electrodes formed of a transparent conductive material such as indium tin oxide (ITO) or indium zinc oxide (IZO). The light-shielding layer BM is, for example, a conductive layer having a lower resistance than the common electrode CE. In one example, the light-shielding layer BM is formed of a nontransparent metal material such as molybdenum, aluminum, tungsten, titanium or silver. The transparent layers 30 and 40 are insulating layers formed of, for example, an organic material such as siloxane-based resin or fluorine-based resin. The alignment films AL1 and AL2 are horizontal alignment films having an alignment restriction force substantially parallel to the X-Y plane. In one example, the alignment films AL1 and AL2 are provided with alignment treatment along the first direction X. Note that the alignment treatment may be rubbing treatment or photo-alignment treatment.

Regarding a reflective index, the transparent substrates 10 and 20 have reflective indexes n10 and n20, respectively. The transparent layers 30 and 40 have refractive indexes n30 and n40. The refractive indexes n30 and n40 are less than the refractive indexes n10 and n20. In one examples, the transparent layers 30 and 40 are formed of the same material, and the refractive indexes n30 and n40 are equal. Being "equal" here is not limited to a case where a refractive index difference is zero but includes a case where a refractive index difference is less than or equal to 0.03. For example, the refractive indexes n10 and n20 are about 1.5, and the refractive indexes n30 and n40 are greater than or equal to 1.0 but less than or equal to 1.41.

In the example shown in FIG. 3, the main surface 10B of the transparent substrate 10 is in contact with air. However, another transparent layer having an equal refractive index to the transparent layer 40 may be disposed on the entire surface of the main surface 10B. In addition, another transparent layer having an equal refractive index to the transparent layer 30 may be disposed on the entire surface of the main surface 20A of the transparent substrate 20.

Figure 4:
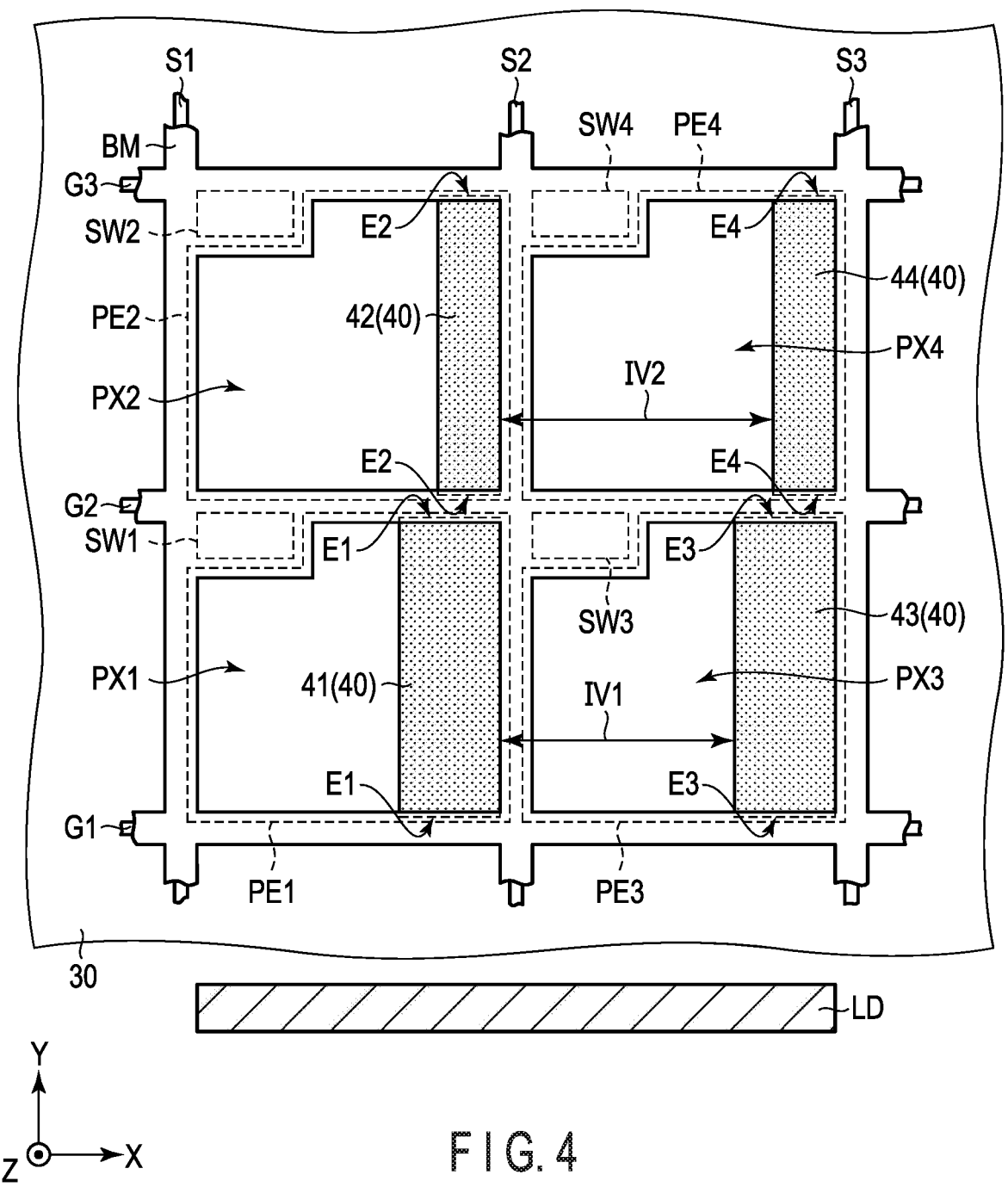
FIG. 4 is a plan view showing one configuration example of the display panel PNL shown in FIG. 1.

FIG. 4 is a plan view showing one configuration example of the display panel PNL shown in FIG. 1. Here, the explanation will be focused on four pixels PX1 to PX4 arrayed in a matrix. Scanning lines G1 to G3 extend along the first direction X and are disposed at intervals along the second direction Y. Signal lines S1 to S3 extend along the second direction Y and are disposed at intervals along the first direction X. The pixels PX1 to PX4 correspond to regions partitioned by the scanning lines G1 to G3 and the signal lines S1 to S3. The pixels PX1 and PX3 are adjacent to each other in the first direction X and are closer to the light-emitting element LD than the pixel electrodes PX2 and PX4. The pixel PX1 includes a switching element SW1 and a pixel electrode PE1. Similarly, the pixels PX2 to PX4 include switching elements SW2 to SW4, respectively, and pixel electrodes PE2 to PE4, respectively. The pixel electrodes PE1 and PE2 are disposed at an interval along the second direction Y. The pixel electrodes PE1 and PE3 are disposed at an interval along the first direction X. The pixel electrodes PE1 and PE3 are close to the light-emitting element LD, and the pixel electrodes PE2 and PE4 are away from the light-emitting element LD.

The transparent layer 30 is continuously disposed over the pixels PX1 to PX4. That is, the transparent layer 30 overlaps the scanning lines G1 to G3, the signal lines S1 to S3, the switching element SW1 to SW4 and the pixel electrodes PE1 to PE4. Although not described in detail, the transparent layer 30 is disposed over the entire region of the display portion DA in the second substrate SUB2.

The transparent layer 40 has transparent layers 41 to 44 disposed respectively in the pixels PX1 to PX4. In the illustrated example, the transparent layers 41 to 44 are formed in an island shape extending along the second direction Y and are apart from one another. For example, the transparent layers 41 and 43 are disposed at an interval IV1 in the first direction X, and the transparent layers 42 and 44 are disposed at an interval IV2 in the first direction X. The interval IV1 is less than the interval IV2. The transparent layers 41 and 42 are disposed at an interval along the second direction Y, and the transparent layers 43 and 44 are disposed at an interval along the second direction Y. Note that the transparent layers 41 and 42 may be continuously formed, and similarly, the transparent layers 43 and 44 may be continuously formed.

The transparent layer 41 overlaps the pixel electrode PE1, and the transparent layer 42 overlaps the pixel electrode PE2. The transparent layer 41 has a larger area than the transparent layer 42. Therefore, an area in which the transparent layer 41 overlaps the pixel electrode PE1 is greater than an area in which the transparent layer 42 overlaps the pixel electrode PE2. Similarly, the transparent layers 43 and 44 overlap the pixel electrodes PE3 and PE4, respectively. The area in which the transparent layer 41 overlaps the pixel electrode PE1 is equal to an area in which the transparent layer 43 overlaps the pixel electrode PE3, and the area in which the transparent layer 42 overlaps the pixel electrode PE2 is equal to an area in which the transparent layer 44 overlaps the pixel electrode PE4.

When an installation area per pixel is defined as an area overlapping the pixel electrode PE in planar view, for example, in the first pixel PX, the transparent layer 30 overlaps almost the entire pixel electrode PE1, whereas the transparent layer 41 overlaps a part of the pixel electrode PE1, and the installation area of the transparent layer 41 is less than the installation area of the transparent layer 30. The same applies to the other pixels PX2 to PX4.

The light-shielding layer BM is formed in a lattice shape. The light-shielding layer BM overlaps the scanning lines G1 to G3, the signal lines S1 to S3 and the switching elements SW1 to SW4. In addition, the light-shielding layer BM overlaps a pair of end portions E1 of the transparent layer 41, a pair of end portions E2 of the transparent layer 42, a pair of end portions E3 of the transparent layer 43, and a pair of end portions E4 of the transparent layer 44. These end portions E1 to E4 are end portions extending along the first direction X.

FIG. 5 is a cross-sectional view showing one configuration example of the display device DSP of the present embodiment. Note that, regarding the display panel PNL, only main parts are illustrated. The emitted light from the light-emitting element LD will be explained with reference to FIG. 5.

The light-emitting element LD emits light L1 toward the side surface E11. Since an air layer is present between the light-emitting element LD and the side surface E11, the light L1 emitted from the light-emitting element LD is refracted at the side surface E11 and enters the transparent substrate 10. Light traveling toward the main surface 10B of the light L1 entering the transparent substrate 10 is reflected at the interface between the transparent substrate 10 and an air layer. In addition, light traveling toward the light-shielding layer BM of the light L1 entering the transparent substrate 10 is reflected at the light-shielding layer BM. Furthermore, light traveling toward the transparent layer 40 of the light L1 entering the transparent substrate 10 is reflected at the interface between the common electrode CE and the transparent layer 40 and does not reach the alignment film AL1, the liquid crystal layer LC and the second substrate SUB2. As described above, close to the side surface E11 (or in a region in which the transparent layer 40 is present), the light L1 travels inside the transparent substrate 10 while being repeatedly reflected. Light traveling toward a region in which the transparent layer 40 is not present, that is, a region in which the common electrode CE and the alignment film AL are in contact with each other of the traveling light L1 enters the liquid crystal layer LC.

As explained with reference to FIG. 4, the installation area per pixel of the transparent layer 40 is small in the region close to the light-emitting element LD as compared with the region away from the light-emitting element LD. Therefore, while the entry to the liquid crystal layer LC of the light L1 from the light-emitting element LD is suppressed in the region close to the light-emitting element LD, the entry to the liquid crystal layer LC of the light L1 is promoted in the region away from the light-emitting element LD. In the region close to the light-emitting element LD, not all the entry to the liquid crystal layer LC of the light L1 is suppressed, but the light L1 enters the liquid crystal layer LC from a region in which the transparent layer 40 does not overlap the pixel electrode PE as shown in FIG. 4.

Light traveling toward the transparent layer 30 of the light entering the liquid crystal layer LC is reflected at the interface between the alignment film AL2 and the transparent layer 30. The light L1 entering the liquid crystal layer LC is transmitted through the pixel in the transparent state and is scattered in the pixel in the scattering state. The display device DSP can be observed from an observation position VP1 on a main surface 10B side and can also be observed from an observation position VP2 on a main surface 20A side. In addition, regardless of whether the display device DSP is observed from the observation position VP1 or the observation position VP2, the background of the display device DSP can be observed via the display device DSP.

According to the present embodiment, in the region in which the transparent layer 40 is present, the light traveling inside the transparent substrate 10 does not enter the alignment film AL1 but travels inside the transparent substrate 10. Accordingly, undesired absorption or scattering in the alignment films AL1 and AL2 can be suppressed, and a decrease in the use efficiency of the light from the light-emitting element LD can be suppressed.

In particular, when attention is focused on the luminance distribution of the light from the light-emitting element LD, the luminance tends to decrease rapidly as the light travels away from the light-emitting element LD. One cause of the decrease in luminance is undesired absorption. Therefore, the decrease in luminance can be suppressed by suppressing absorption in the alignment films AL1 and AL2.

In addition, the pixel electrode PE, the capacitance electrode 23, the switching element SW, the signal line S and the scanning line G are located between the transparent layer 30 and the transparent substrate 20. Since the light traveling toward the transparent layer 30 of the light L1 entering the liquid crystal layer LC is reflected at the interface between the alignment film AL2 and the transparent layer 30, undesired absorption and scattering in the pixel electrode PE, the capacitance electrode 23, the switching element SW, the signal line S and the scanning line G are suppressed. Therefore, according to the present embodiment, degradation of display quality can be suppressed.

Furthermore, the region in which the transparent layer 40 overlaps the pixel electrode PE corresponds to a region where the light from the light-emitting element LD hardly enters the alignment film AL1 and the liquid crystal layer LC, and the region in which the transparent layer 40 does not overlap the pixel electrode PE (or in the region between the transparent layers 40 which are adjacent to each other) corresponds to a region in which the light from the light-emitting element LD enters the liquid crystal layer LC via the alignment film AL1. The installation area per pixel of the transparent layer 40 is small in the region close to the light-emitting element LD as compared with the region away from the light-emitting element LD. Therefore, while the entry to the pixel of the light is suppressed in the region close to the light-emitting element LD, the entry to the pixel of the light is promoted in the region away from the light-emitting element LD. As described above, the light from the light-emitting element LD attenuates as the light travels away from the light-emitting element LD. The luminance of the light in the region close to the light-emitting element LD is referred to the first luminance, and the luminance of the light in the region away from the light-emitting element LD is referred to as the second luminance. The second luminance is less than the first luminance. The installation area of the transparent layer 40 installed in the pixel PX1 shown in FIG. 4 is greater than the installation area of the transparent layer 40 installed in the pixel PX2. Therefore, the area of a region in which the light can enter the pixel PX1 is less than the area of a region in which the light can enter the pixel PX2. On the other hand, the first luminance of the light entering the pixel PX1 is greater than the second luminance of the light entering the pixel XP2. Therefore, the amounts of illumination light in the pixel PX1 and the pixel PX2 can be equalized.

In the configuration example shown in FIGS. 1 to 5, the transparent substrate 10 corresponds to the first transparent substrate, the alignment film AL1 corresponds to the first alignment film, the transparent layer 40 corresponds to the first transparent layer, the transparent substrate 20 corresponds to the second transparent substrate, the transparent layer 30 corresponds to the second transparent layer, the alignment film AL2 corresponds to the second alignment film, the pixel electrode PE1 corresponds to the first pixel electrode, and the pixel electrode PE2 corresponds to the second pixel electrode. Note that the scanning line G, the signal line S, the switching element SW and the pixel electrode PE may be disposed in the first substrate SUB1, and the common electrode CE may be disposed in the second substrate SUB2.

Next, other configuration examples of the present embodiment will be explained.

Figure 6:
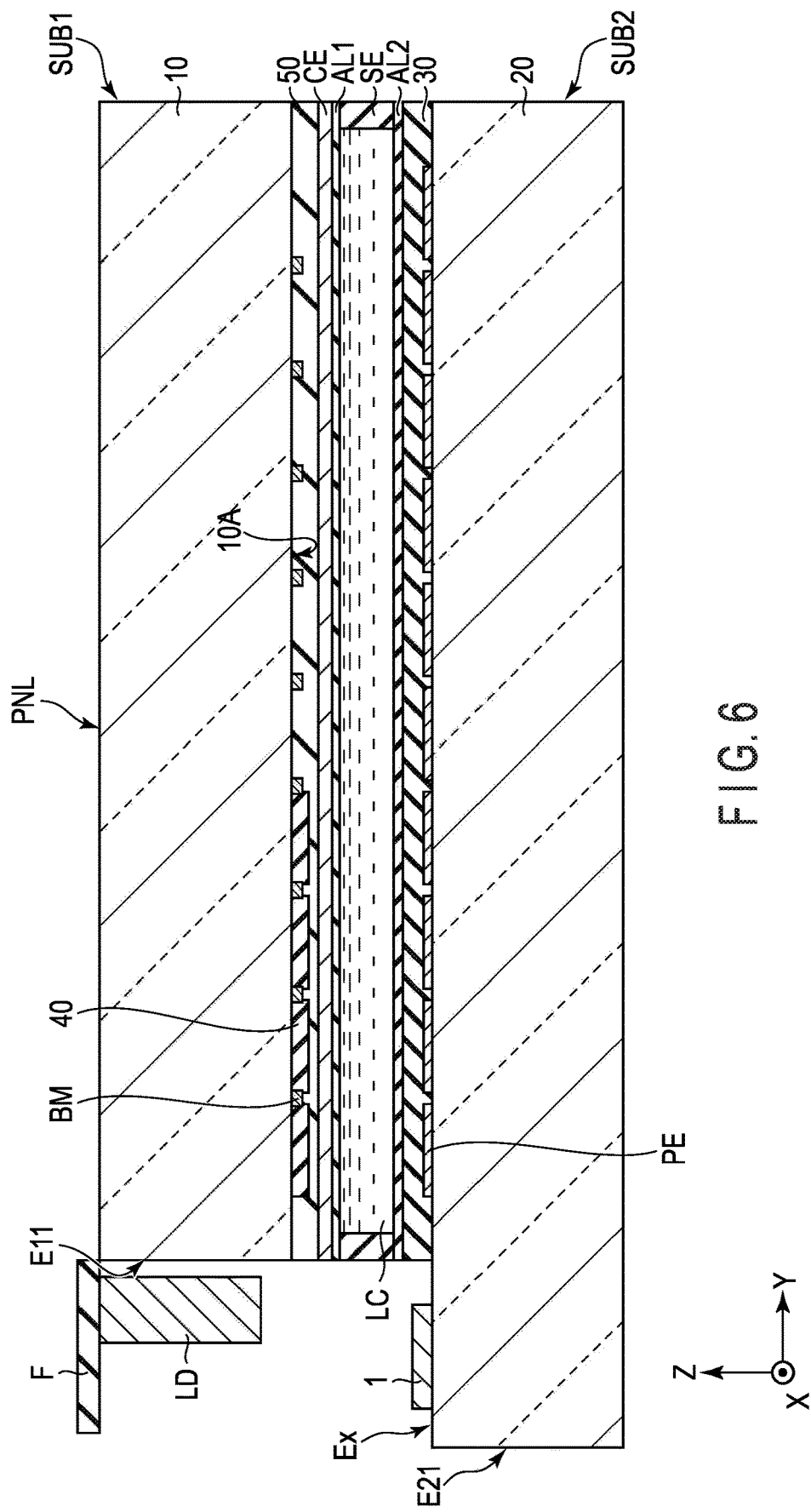
FIG. 6 is a cross-sectional view showing another configuration example of the display device DSP shown in FIG. 5.

FIG. 6 is a cross-sectional view showing another configuration example of the display device DSP shown in FIG. 5. The configuration example shown in FIG. 6 is different from the configuration example shown in FIG. 5 in that the first substrate SUB1 includes an insulating film 50. The transparent layer 40 is formed on the main surface 10A and is covered with the insulating film 50. The common electrode CE is located below the insulating film 50 and is covered with the alignment film AL1. The insulating film 50 is, for example, an organic insulating film formed of an organic material such as acrylic resin. A lower surface of the insulating film 50 which is in contact with the common electrode CE is planarized. In the illustrated example, the transparent layer 40 is located between the common electrode CE and the transparent substrate 10.

Also in this configuration example, similar effects to those of the configuration example shown in FIG. 5 can be obtained. In addition, since the transparent layer 40 is located between the transparent substrate 10 and the common electrode CE, as compared with a case where the transparent layer 40 is located between the common electrode CE and the alignment film AL1, the common electrode CE approaches the pixel electrode PE along the third direction Z, and a decrease in the electric field strength between the pixel electrode PE and the common electrode CE can be suppressed.

Figure 7:
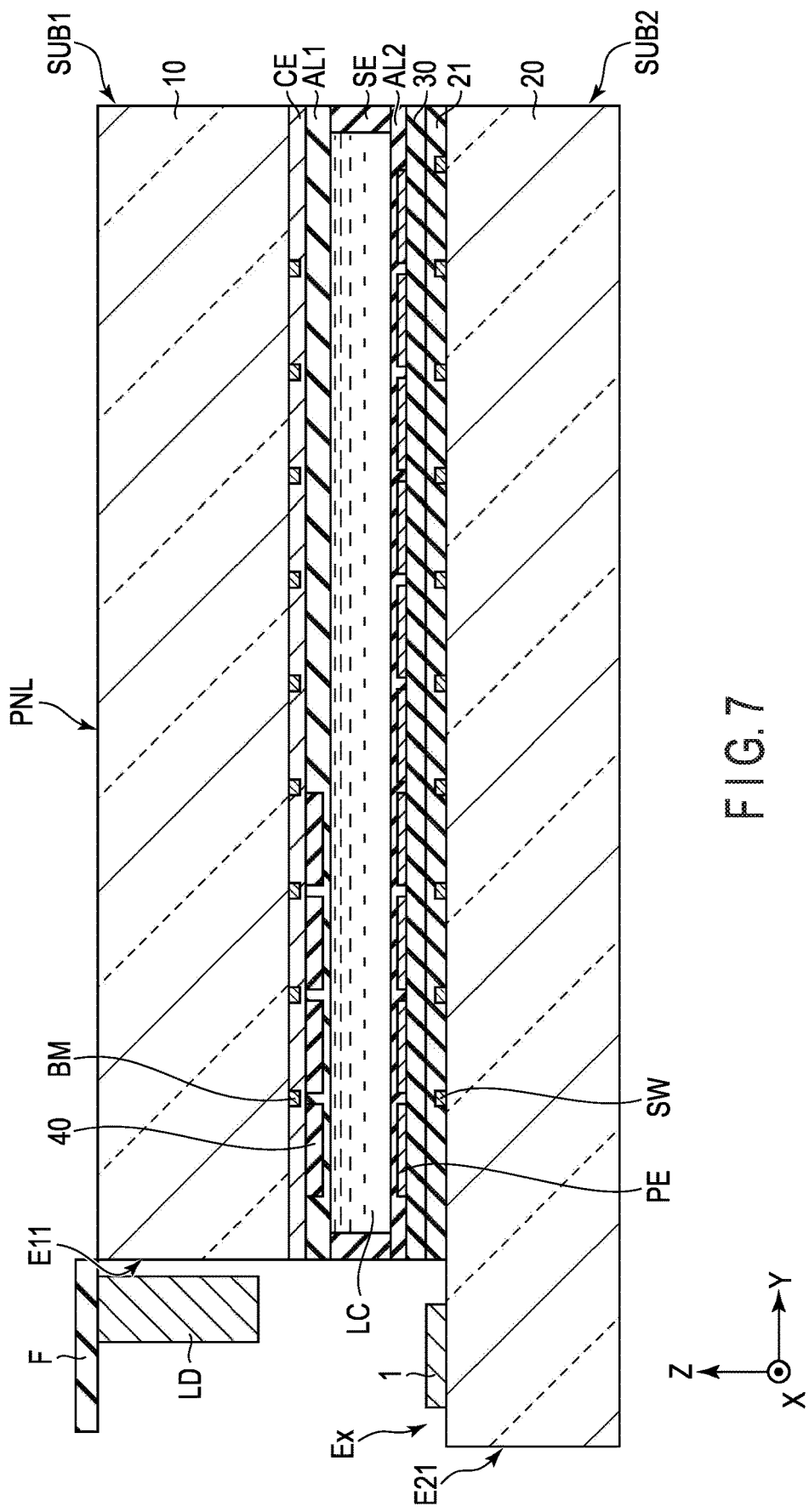
FIG. 7 is a cross-sectional view showing another configuration example of the display device DSP shown in FIG. 5.

FIG. 7 is a cross-sectional view showing another configuration example of the display device DSP shown in FIG. 5. The configuration example shown in FIG. 7 is different from the configuration example shown in FIG. 5 in that the pixel electrode PE is formed on the transparent layer 30. The transparent layer 30 is located between the switching element SW and the pixel electrode PE.

Also in this configuration example, similar effects to those of the configuration example shown in FIG. 5 can be obtained. In addition, since the transparent layer 30 is located between the transparent substrate 20 and the pixel electrode PE, as compared with a case where the transparent layer 30 is located between the pixel electrode PE and the alignment film AL2, the pixel electrode PE approaches the common electrode CE along the third direction Z, and a decrease in the electric field strength between the pixel electrode PE and the common electrode CE can be suppressed.

Note that, although the insulating film 21 is located between the transparent substrate 20 and the transparent layer 30 in the illustrated example, the insulating film 21 may be omitted.

Figure 8:
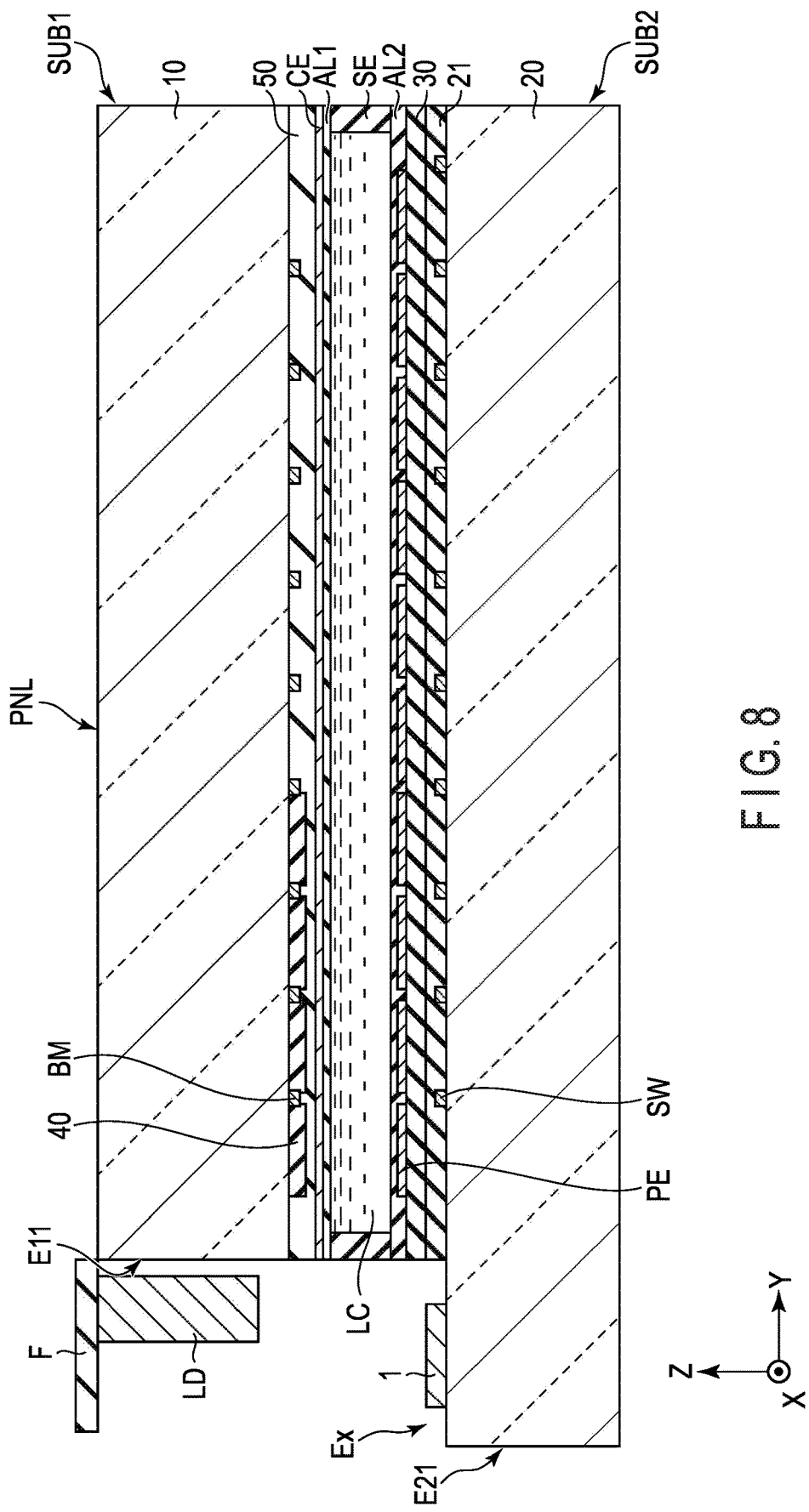
FIG. 8 is a cross-sectional view showing another configuration example of the display device DSP shown in FIG. 5.

FIG. 8 is a cross-sectional view showing another configuration example of the display device DSP shown in FIG. 5. The configuration example shown in FIG. 8 corresponds to an example where the first substrate SUB1 shown in FIG. 6 and the second substrate SUB2 shown in FIG. 7 are combined.

Also in this configuration example, similar effects to those of the configuration example shown in FIG. 5 can be obtained. In addition, since the transparent layer 30 and the transparent layer 40 are not located between the pixel electrode PE and the common electrode CE, the common electrode CE and the pixel electrode PE approach each other along the third direction Z, and a decrease in the electric field strength between the pixel electrode PE and the common electrode CE can be further suppressed.

Next, other configuration examples of the transparent layer 40 will be explained with reference to FIGS. 9 and 10.

Figure 9:
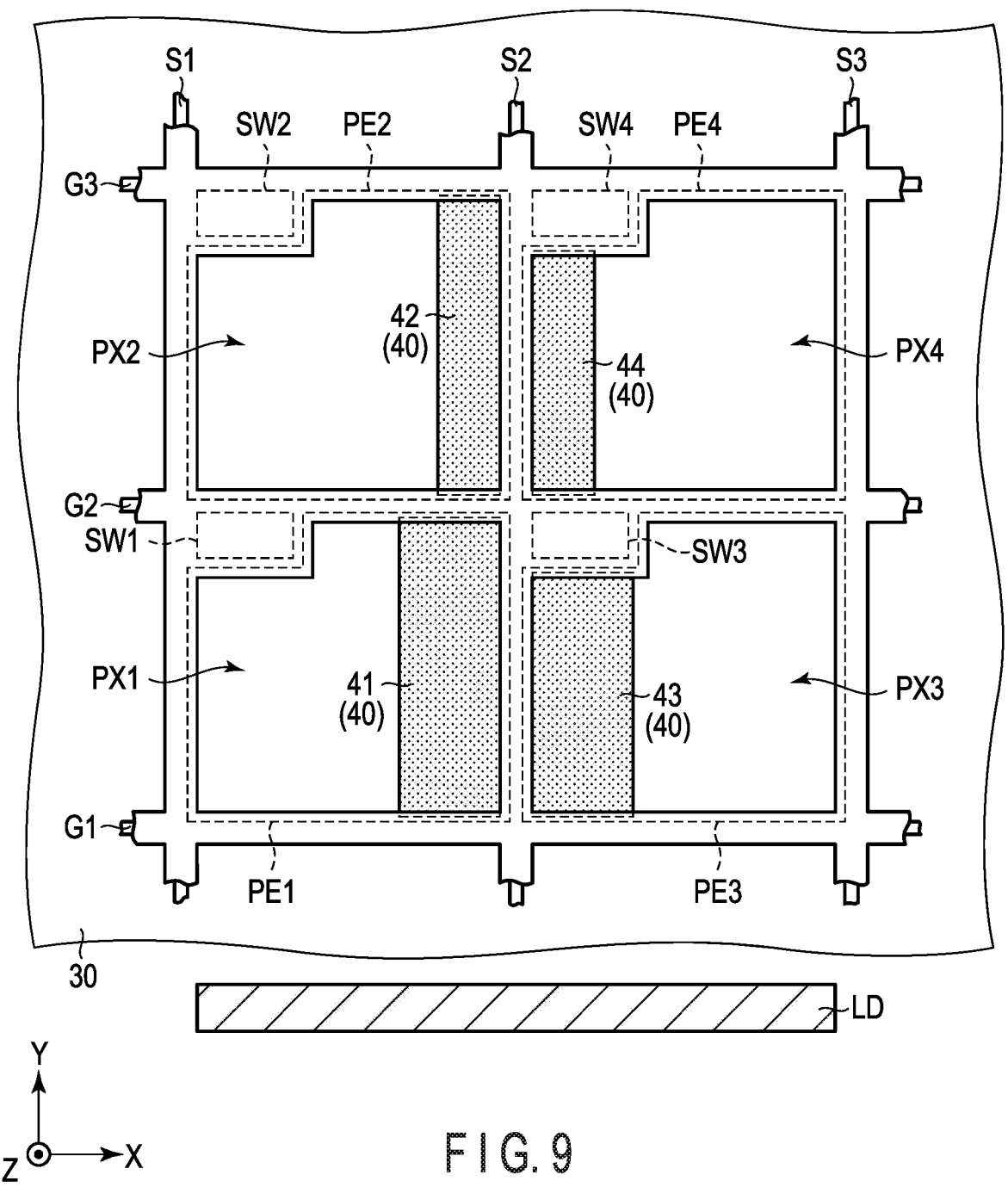
FIG. 9 is a plan view showing another configuration example of a transparent layer 40 shown in FIG. 4.

FIG. 9 is a plan view showing another configuration example of the transparent layer 40 shown in FIG. 4. The configuration example shown in FIG. 9 is different from the configuration example shown in FIG. 4 in that the transparent layers 43 and 44 are close to the signal line S2. Note that the transparent layers 41 to 44 may be continuously formed.

Figure 10:
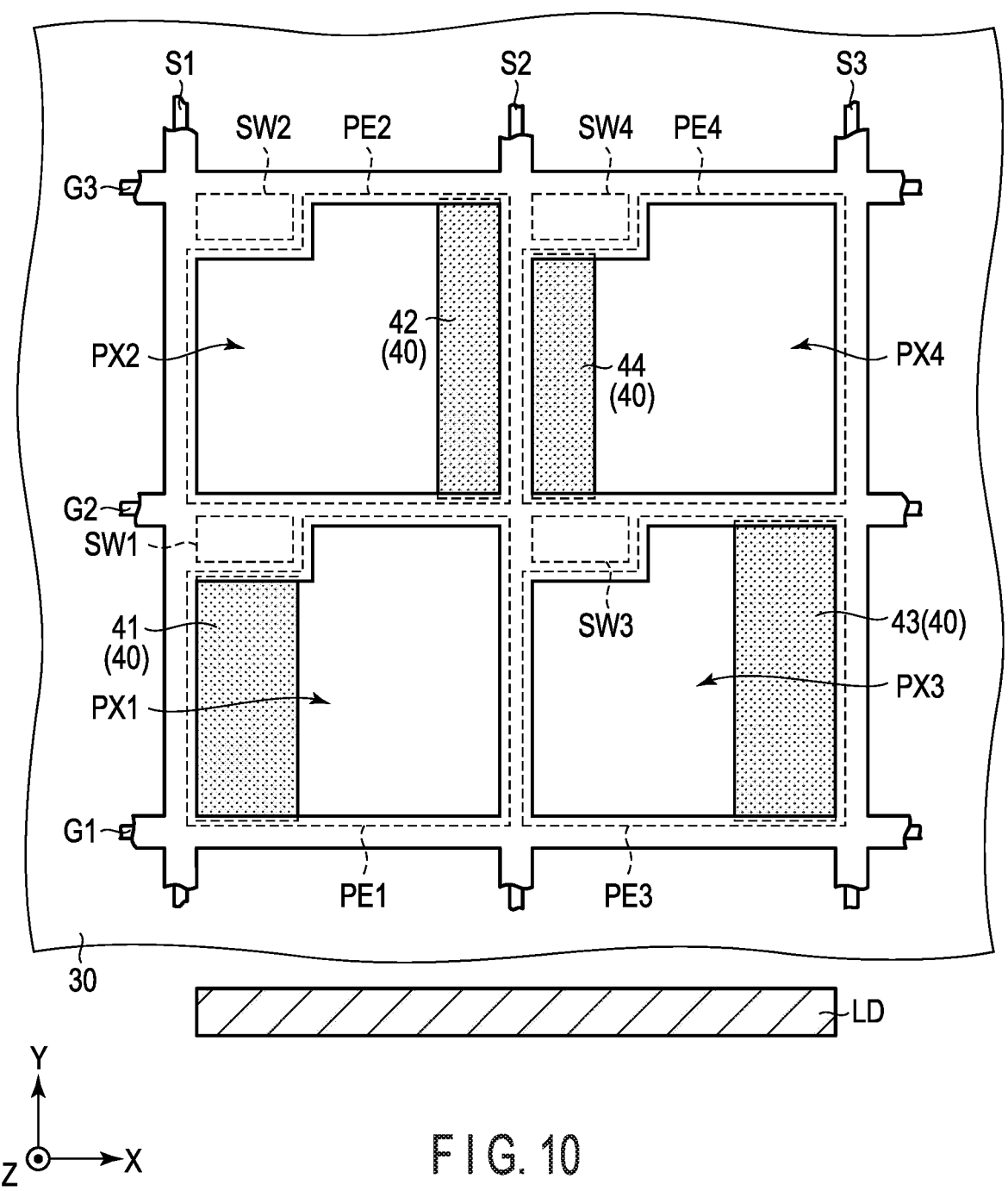
FIG. 10 is a plan view showing another configuration example of the transparent layer 40 shown in FIG. 4.

FIG. 10 is a plan view showing another configuration example of the transparent layer 40 shown in FIG. 4. The configuration example shown in FIG. 10 is different from the configuration example shown in FIG. 4 in that the transparent layer 41 is close to the signal line S1 and the transparent layer 44 is close to the signal line S2. Note that the transparent layers 42 and 44 may be continuously formed.

Also in the configuration examples shown in FIGS. 9 and 10, similar effects to those described above can be obtained.

As described above, according to the present embodiment, a display device which can suppress degradation of display quality can be provided.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

An example of the display device obtained from the configurations disclosed in the specification will be appended below.

(1)

A display device including:

a first substrate including a first transparent substrate having a side surface and a main surface, a first alignment film disposed along the main surface, and a first transparent layer located between the first transparent substrate and the first alignment film;

a second substrate including a second transparent substrate, a scanning line, a signal line crossing the scanning line, a switching element electrically connected to the scanning line and the signal line, and a pixel electrode electrically connected to the switching element;

a liquid crystal layer held between the first substrate and the second substrate and containing a stripe-shaped polymer and liquid crystal molecules; and a light-emitting element opposed to the side surface, wherein the first transparent layer overlaps a part of the pixel electrode and has a lower refractive index than the first transparent substrate.

(2)

The display device described in (1), wherein the first transparent layer has a refractive index of greater than or equal to 1.0 but less than or equal to 1.41.

(3)

The display device described in any one of (1) and (2), wherein the first substrate further includes a common electrode opposed to the pixel electrode, and the first transparent layer is located between the common electrode and the first alignment film.

(4)

The display device described in any one of (1) and (2), wherein the first substrate further includes a common electrode opposed to the pixel electrode, and the first transparent layer is located between the common electrode and the first transparent substrate.

(5)

The display device described in any one of (1) to (4), wherein the second substrate further includes a second alignment film contacting the liquid crystal layer, and a second transparent layer located between the switching element and the second alignment film, and the second transparent layer has an equal refractive index to the first transparent layer.

(6)

The display device described in (5), wherein the second transparent layer is located between the pixel electrode and the second alignment film.

(7)

The display device described in (5), wherein the second transparent layer is located between the switching element and the pixel electrode.

(8)

A display device including:

a first substrate including a first transparent substrate having a side surface and a main surface, and a first alignment film disposed along the main surface;

a second substrate including a second transparent substrate, a scanning line, a signal line crossing the scanning line, a switching element electrically connected to the scanning line and the signal line, a pixel electrode electrically connected to the switching element, a second alignment film located on the pixel electrode, and a second transparent layer located between the switching element and the second alignment film;

a liquid crystal layer held between the first substrate and the second substrate and containing a stripe-shaped polymer and liquid crystal molecules; and a light-emitting element opposed to the side surface, wherein the second transparent layer overlaps the pixel electrode and has a lower refractive index than the first transparent substrate.

(9)

A display device including:

a first substrate;

a second substrate;

a liquid crystal layer held between the first substrate and the second substrate and containing a stripe-shaped polymer and liquid crystal molecules;

a light-emitting element; and pixels arrayed in a matrix, wherein the first substrate includes a first transparent substrate having a side surface opposed to the light-emitting element, a first alignment film contacting the liquid crystal layer, and a first transparent layer located between the first transparent substrate and the first alignment film, the second substrate includes a second transparent substrate, a second alignment film contacting the liquid crystal layer, and a second transparent layer located between the second transparent substrate and the second alignment film, the first transparent layer and the second transparent layer are insulating layers, and an installation area per pixel of the first transparent layer is less than an installation area per pixel of the second transparent layer.

(10)

The display device described in (9), wherein the second substrate further includes a first pixel electrode disposed in a first pixel close to the light-emitting element, and a second pixel electrode disposed in a second pixel away from the light-emitting element, and an area in which the first transparent layer overlaps the first pixel electrode is less than an area in which the first transparent layer overlaps the second pixel electrode.

(11)
The display device described in (10), wherein
the first substrate further includes a common electrode opposed to the first pixel electrode and the second pixel electrode, and
the first transparent layer is located between the common electrode and the first alignment film.

(12)
The display device described in (10), wherein
the first substrate further includes a common electrode opposed to the first pixel electrode and the second pixel electrode, and
the first transparent layer is located between the common electrode and the first transparent substrate.

(13)
The display device described in (9), wherein
the second substrate further includes a scanning line, a signal line crossing the scanning line, a switching element electrically connected to the scanning line and the signal line, and a pixel electrode electrically connected to the switching element, and
the scanning line, the signal line and the switching element are located between the second transparent substrate and the second transparent layer.

(14)
The display device described in (13), wherein
the second transparent layer is located between the pixel electrode and the second alignment film.

(15)
The display device described in (13), wherein the second transparent layer is located between the switching element and the pixel electrode.

(16)
The display device described in any one of (9) to (15), wherein the first transparent layer and the second transparent layer each have a lower refractive index than the first transparent substrate.

(17)
The display device described in (16), wherein the first transparent layer and the second transparent layer each have a refractive index of greater than or equal to 1.0 but less than or equal to 1.14.

(18)
The display device described in (17), wherein the first transparent layer and the second transparent layer have an equal refractive index.

(19)
The display device described in (9), wherein
the side surface extends along a first direction, and
the first transparent layers are disposed at intervals along the first direction.

(20)
The display device described in (19), wherein the interval on a side close to the light-emitting element is less than the interval on a side away from the light-emitting element.

What is claimed is:

1. A display device comprising:
a first substrate;
a second substrate;
a liquid crystal layer held between the first substrate and the second substrate and containing a stripe-shaped polymer and liquid crystal molecules;
a light-emitting element; and
pixels arrayed in a matrix, wherein
the first substrate comprises a first transparent substrate having a side surface opposed to the light-emitting element, a first alignment film contacting the liquid crystal layer, and a first transparent layer located between the first transparent substrate and the first alignment film,
the second substrate comprises a second transparent substrate, a second alignment film contacting the liquid crystal layer, and a second transparent layer located between the second transparent substrate and the second alignment film,
the first transparent layer and the second transparent layer are insulating layers, and
an installation area per pixel of the first transparent layer is less than an installation area per pixel of the second transparent layer.

2. The display device of claim 1, wherein
the second substrate further comprises a first pixel electrode disposed in a first pixel close to the light-emitting element, and a second pixel electrode disposed in a second pixel away from the light-emitting element, and
an area in which the first transparent layer overlaps the first pixel electrode is less than an area in which the first transparent layer overlaps the second pixel electrode.

3. The display device of claim 2, wherein
the first substrate further comprises a common electrode opposed to the first pixel electrode and the second pixel electrode, and
the first transparent layer is located between the common electrode and the first alignment film.

4. The display device of claim 2, wherein
the first substrate further comprises a common electrode opposed to the first pixel electrode and the second pixel electrode, and
the first transparent layer is located between the common electrode and the first transparent substrate.

5. The display device of claim 1, wherein
the second substrate further comprises a scanning line, a signal line crossing the scanning line, a switching element electrically connected to the scanning line and the signal line, and a pixel electrode electrically connected to the switching element, and
the scanning line, the signal line and the switching element are located between the second transparent substrate and the second transparent layer.

6. The display device of claim 5, wherein
the second transparent layer is located between the pixel electrode and the second alignment film.

7. The display device of claim 5, wherein the second transparent layer is located between the switching element and the pixel electrode.

8. The display device of claim 1, wherein the first transparent layer and the second transparent layer each have a lower refractive index than the first transparent substrate.

9. The display device of claim 8, wherein the first transparent layer and the second transparent layer each have a refractive index of greater than or equal to 1.0 but less than or equal to 1.14.

10. The display device of claim 9, wherein the first transparent layer and the second transparent layer have an equal refractive index.

11. The display device of claim 1, wherein
the side surface extends along a first direction, and
the first transparent layers are disposed at intervals along the first direction.

12. The display device of claim 11, wherein the interval on a side close to the light-emitting element is less than the interval on a side away from the light-emitting element.

* * * * *